United States Patent [19]

Sorenson

[11] 3,984,662

[45] Oct. 5, 1976

[54] RATE RECORDING SYSTEM

[75] Inventor: Lon A. Sorenson, Cherry Hill, N.J.

[73] Assignee: Infomat Corporation, Cherry Hill, N.J.

[22] Filed: Sept. 30, 1974

[21] Appl. No.: 510,300.

[52] U.S. Cl. .......................... 235/92 DP; 235/92 T; 340/172.5; 340/173 RC

[51] Int. Cl.[2] ............................................ G06F 3/12

[58] Field of Search .................. 340/173 RC, 172.5; 235/92 DP, 92 T, 92 SH

[56] References Cited

UNITED STATES PATENTS

| | | | |
|---|---|---|---|
| 3,153,776 | 10/1964 | Schwartz | 340/173 RC |
| 3,351,917 | 11/1967 | Shimabukuro | 340/172.5 |
| 3,387,275 | 6/1968 | Gooding et al. | 340/173 RC |
| 3,400,384 | 9/1968 | Hildebrandt | 340/173 RC |
| 3,480,931 | 11/1969 | Geissler et al. | 340/172.5 |
| 3,500,024 | 3/1970 | Stacy et al. | 235/92 TF |
| 3,634,832 | 1/1972 | Taddei et al. | 340/172.5 |

*Primary Examiner*—Leo H. Boudreau
*Attorney, Agent, or Firm*—Charles F. Duffield

[57] ABSTRACT

A system is disclosed for determining and recording a plurality of individual rates of occurrence of predetermined events over a time span wherein the system utilizes a sensor-accumulator which senses the occurrence of a plurality of events over a predetermined time and translates the accumulated total into a binary expression. The binary expressions are periodically written into a dynamic recirculated memory in a serial fashion and after a predetermined time are all read out to a printing device. The position of the last entered binary expression in the recirculating memory is indexed by means of a counter which is reset to zero upon entry of a word and initiates counting upon the entry of the last bit of the word. A decoder is set to generate a signal each time the counter reaches a count equal to the memory capacity to thus index each complete recirculation of the memory past the point of the last bit entered. Readout of the memory is controlled by initiating a count upon the appearance of the index signal equal to the difference between the memory capacity and the number of bits entered into memory to thus establish the first entered bit in the serial train whereupon the content of the memory is serially read out.

9 Claims, 2 Drawing Figures

RATE RECORDING SYSTEM

BACKGROUND AND SUMMARY OF INVENTION

The rate recording system of the present invention is within the field of devices which operate in real time to sense or monitor processes and events, determine a rate of occurrence of the events over predetermined times and record the various rates for future reference.

The particular system of the present invention may be used to sense the occurrence of such events as traffic passage, industrial machinery output, occurrence of given events in hospital care monitoring and in any other situations in statistical processing control wherein significant events are occurring which are desired to be detected and recoded. The system of the present invention senses each particular event involved, translates the event to a binary count and accumulates the events over a predetermined sampling period. At the end of the time interval, the accumulated events, which have been translated to a binary count, are written to a memory and a new sampling period started. The binary expression entered into the memory is thus a rate expression for the particular time interval involved.

The system continues to accumulate successive rate expressions and record them in the memory for a further predetermined total sampling time. At the end of the total sampling period, the respective rate determinations are read from memory and recorded onto a permanent log.

More specifically, the rate recording system of the present invention accumulates the sensed events in a counter or rate accumulator over the predetermined sampling interval. At the end of the sampling interval, which is internally controlled within the system, the count in the rate accumulator is passed to a parallel in-serial out converter.

The memory employed in the rate recording system of the present invention is a dynamic recirculating memory. Immediately preceding the entry of the rate expression into the parallel in-serial out converter, the recirculating memory is placed in the write mode and the rate expression in the converter is shifted into the recirculating memory. Once the rate word has been entered into the memory, the system is returned to the sensing mode for the next sampling interval and the cycle repeated until the total sampling period has been completed.

Each rate word or binary expression is entered into the memory in a serial fashion, i.e. each succeedingly generated and entered rate word follows the preceding rate word in the train of words circulating in the memory. Indexing of the position in the memory of the last entered word is accomplished in accordance with the present invention by the utilization of a memory position counter of capacity equal to that of the memory. The counter is reset to zero upon entry of a rate word and its count is initiated upon entry of the last bit in the rate word. A decoder is then used to follow the count in the memory position counter and provides an index signal each time the count returns to zero indicating one complete circulation of the memory. The index signal may then be used to operate a second counter to accumulate a predetermined number of index signals to establish the sampling interval and also to index the time to intiate writing to the memory.

The rate recording system further includes a counter which counts the number of binary expressions or rate words entered into the memory. After a predetermined number of such expressions have been entered, as determined by the master sampling period desired, the detected count is used to generate a terminate recording signal which initiates the reading of the data from the memory and recording thereof.

Output from the memory is controlled for first in-first out recording. This is accomplished by creating the terminate recording signal simultaneously with the index signal to establish the position in the memory of the last recorded bit. Thereafter, the count in the memory position counter is decoded at a count representative of the difference between the memory capacity and the total number of bits entered to generate a read signal which occurs at the appearance of the first entered bit.

The binary rate expressions in the memory are serially read from the memory to a serial to parallel output data register. As each word fills the output data register, it is passed in parallel through data gates to a printer to print the particular rate expression. Controls are generated internally within the system to control the output register and printer to accept successively read out words. In accordance with the present invention, the print out may be both a numeric expression of the rate and a bar graph representative of the rate.

The rate recording system counts the number of words exited from the memory. When the number of rate expressions exited from the memory equals that previously entered, the system is returned to the rate accumulate-record mode.

OBJECTS OF INVENTION

It is an object of the present invention to provide an overall system for determining and recording a plurality of individual rates of occurrence of predetermined events which are then stored in a memory and subsequently fed to a printer to produce a time graph portrayal of the events.

It is a further object of the present invention to provide a system for recording rates of occurrence of events which utilizes a circulating memory into which binary expressions representative of each of the events are serially entered and recorded over a predetermined time period and then sequentially and serially read out to a printing apparatus.

It is yet a further object of the present invention to provide a rate recording system utilizing a circulating memory into which successively determined rates are entered, one after another, in serial fashion through utilization of a novel indexing means for determining the position of the last entered bit in the recirculating memory.

DETAILED DESCRIPTION OF INVENTION

Figure 1:
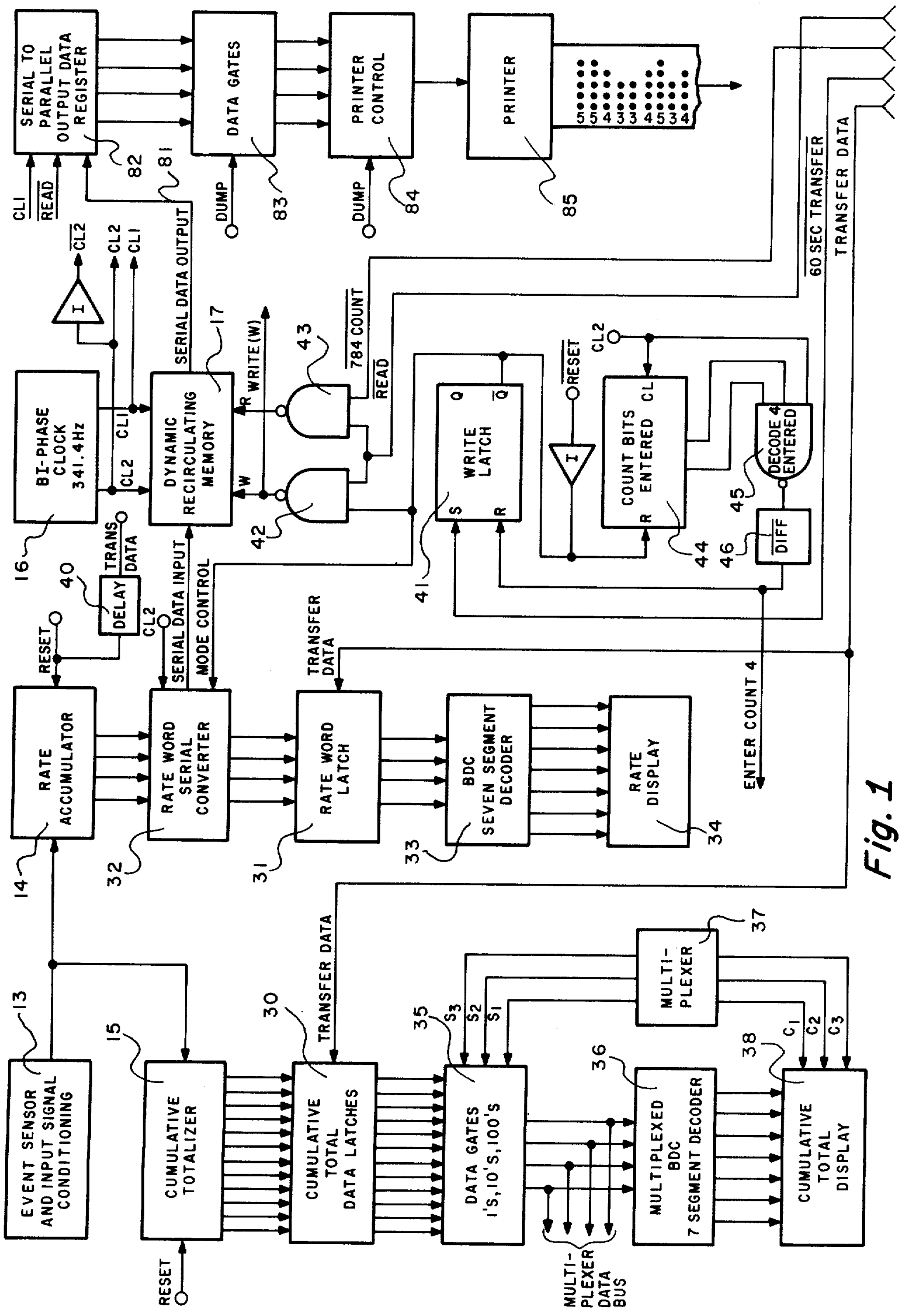
FIG. 1 is a block diagram of a portion of the circuitry of the rate recording system of the present invention.
Figure 2:
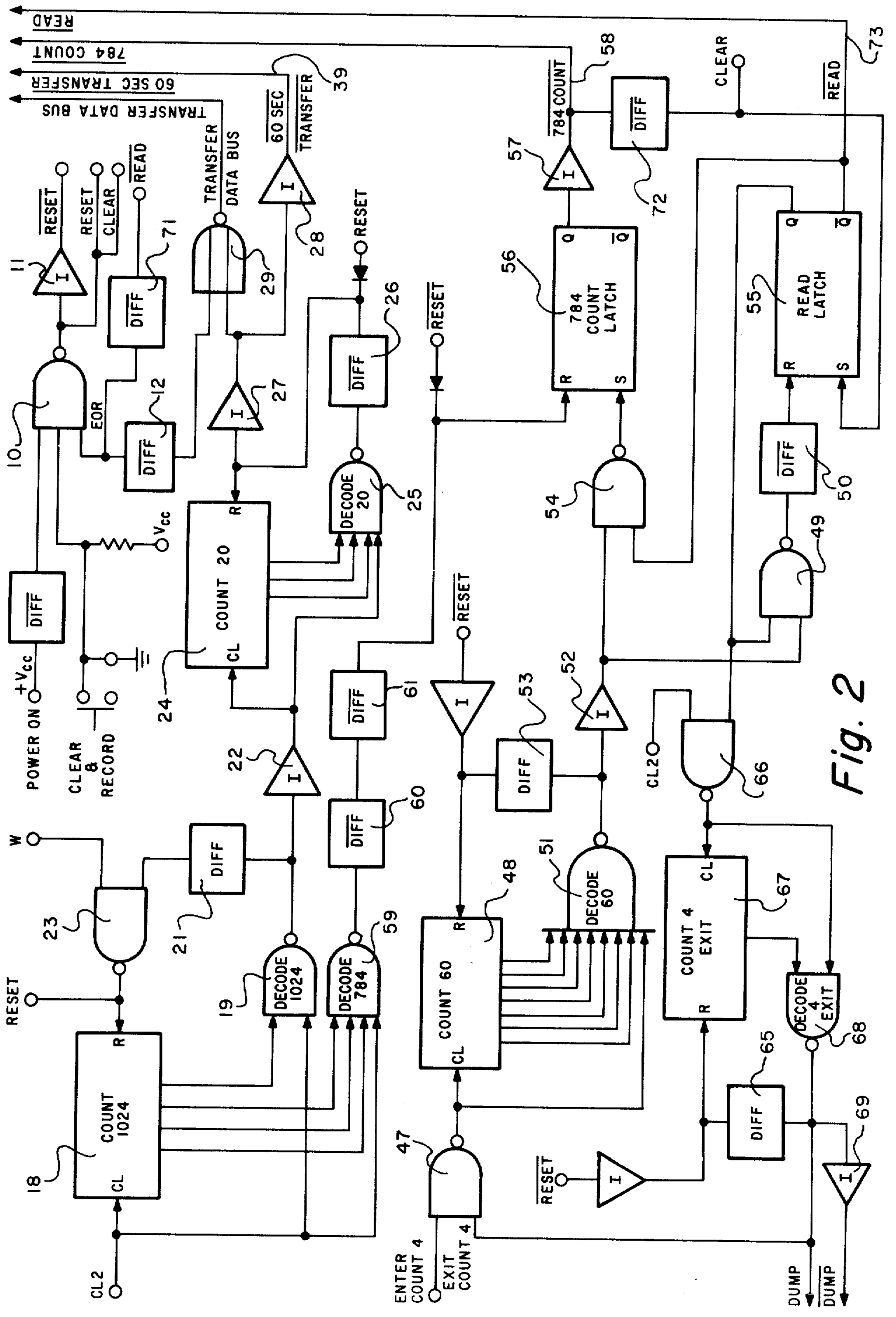
FIG. 2 is a block diagram of the remainder of the system of the present invention.

The system of the present invention for determining and recording individual rates of occurrence is shown in block diagram in FIGS. 1 and 2 of the drawings. A description of the system will be made by describing the operation of the system through one entire complete cycle of operation.

At the beginning of a cycle, and as shown in FIG. 2 of the drawings, the power is turned on and/or the record or clear button engaged. As this happens, a negative signal is sent to a NAND gate 10 creating a negative reset pulse and a positive reset pulse through inverter 11. The reset signals reset all counters and displays to zero preparatory to the beginning of a complete cycle.

Referring to FIG. 1, an event sensor and input signal conditioning device 13 is provided. The function of the event sensor and input signal conditioning device is to sense any of a plurality of conditions such as temperature reaching a predetermined maximum, output from a machine and many other variables which are desired to be sensed. Devices of this type for sensing such events and translating the sensed event into a binary count are well known to those skilled in the art and for that purpose a detailed description thereof is not necessary for the purposes of this explanation. It is believed sufficient to state that, as each event is sensed, the event sensor will produce a binary output representative of the sensed event.

The output from the event sensor 13 is applied to a rate accumulator 14. As successively occurring events occur, the count in the rate accumulator 14 will accordingly be incremented. The accumulator may be of any size desired but will be assumed to be a four bit counter for purposes of explanation.

The output from the event sensor 13 is also simultaneously applied to a cumulative totalizer 15. The cumulative totalizer 15, as the rate accumulator 14, accumulates and totals all of the successively occurring events and may be of whatever capacity desired.

Control and timing of the rate recording system of the present invention is by means of a basic bi-phase clock 16. The clock is operated at 341.4 Hz. and produces a bi-phase output CL1 and CL2. The bi-phase outputs CL1 and CL2 are used in the control of the dynamic recirculating memory 17 and also for shifting and counting in the various registers and counters as will be hereinafter described.

One particular function of the clock is to generate a master sampling pulse representative of a predetermined sampling period. In the particular embodiment being described, the sampling period for each group of events being sensed has been established at 1 minute.

The 1 minute master sampling pulse is created by the circuitry shown in FIG. 2 of the drawings. Specifically, clock pulse CL2 is applied to the clock input of a couner 18 of 1024 bit capacity. This counter had previously been reset to zero at the beginning of the cycle.

The counter 18 includes a decoding NAND gate 19 appropriately connected to the output of the counter. Whenever the counter reaches a count of 1024, the decoding NAND gate 19 decodes this count and generates a negative pulse of clock pulse width.

The output from the decoding NAND gate 19 is applied through an inverter 22 as the clock input to a count 20 counter 24. Counter 24 has appropriately connected to predetermined outputs a decode 20 NAND gate 25. Accordingly, after counter 18 has passed through 20 counts of 1024, counter 20 will reach the 20 count and decoding NAND gate 25 will produce a negative pulse which is differentiated in differentiator 26. The frequency divisions from the basic clock through the 1024 counter and the 20 counter mathematically work out to the 20 count in the counter 24 occurring once each minute. Thus, an output from the NAND gate 25 results as a master sampling clock pulse each minute.

The master sampling clock pulse from the differentiator 26 is applied back to the reset input of the counter 20 to set it to zero. The signal is also applied through an inverter 27 and a second inverter 28 to generate a master sixty second transfer pulse on line 39 for the purpose that will be described hereinafter. Simultaneously, the master sampling pulse is applied from the inverter 27 through an OR gate 29 to create a transfer data pulse.

Referring back to FIG. 1, the transfer data pulse, which was generated at the end of the 60 second sampling period, is applied simultaneously to a cumulative total data latch 30 and a rate word latch 31. At this point in the operation of the system, the rate accumulator 14 will have therein a total equal to the total number of events sensed during the preceding sixty second time interval. The output from the rate accumulator 14 is continuously applied to a rate word serial converter 32. The rate word serial converter 32 is of the type providing parallel input-parallel/serial output depending upon the state of the mode control. At this point in the sequence of events, the mode control has not been changed for serial output and the parallel input to the converter 32 is applied as a parallel output to the rate word latch 31. Upon the appearance of the transfer data pulse at the rate word latch 31, the binary expression present on the output of the converter 31 is latched in the rate word latch 31.

The binary expression contained in latch 31 is applied to a binary to decimal converter 33. The output from the converter 33 is then applied to a rate display 34 which may be of the LED type for visual display of the rate of occurrence of the sensed events during the sampling period.

At this point in the sequence of events, the accumulated total in the cumulative totalizer 15 will equal that in the rate accumulator 14. However, as successive sampling periods are undergone, the cumulative totalizer 15 will reflect the total of the sensed events throughout all of the sampling periods.

The binary count in the cumulative totalizer 15, representative of the total throughout the entire period to that point in the sequence of operations, is applied in a like manner to a cumulative total data latch 30. When the transfer data pulse arrives at the data latch 30, the total in the cumulative totalizer 15 is then latched and applied to data gates 35. The information on the data gates 35 is applied to a multiplexed binary to decimal converter 36 which operates in conjunction with a multiplexer 37 in a conventional and well known fashion to present and register the cumulative total in a cumulative total visual display device 38 which may be of many types such as the LED display type devices.

Once the data in the rate accumulator 14 and cumulative totalizer 15 has been latched in their respective latches, the rate accumulator is reset to zero. This is accomplished by delaying the transfer data pulse in a non-inverting delay 40 and applying the delayed pulse to the reset input of the rate accumulator.

During the sampling period and prior to the generation of the master sampling pulse, the $\overline{Q}$ output of write latch 41 was high. The output from the write latch is applied as the mode control to the rate word serial converter 32. The serial converter is chosen of the type to shift only upon logic zero at the mode control.

The $\overline{Q}$ output from the write latch 41 also provides one of the two inputs to a memory control NAND gate 42. NAND gate 42 and a second NAND gate 43 form the read-write control for the dynamic recirculating memory 17. The other two inputs to the NAND gates 42 and 43, as shown in FIG. 1, are the $\overline{\text{read}}$ signal and the $\overline{\text{784 count}}$ signals which will be discussed hereinafter. During the sampling period, the $\overline{\text{read}}$ and $\overline{\text{784 count}}$ signals are high as well as the $\overline{Q}$ output from the write latch 41. The presence of all highs to the two NAND gates 42 and 43 produces a logic zero input to the read and write controls of the memory and maintains the memory in a recirculating mode.

As above described, the $\overline{\text{60 second transfer}}$ pulse is generated at the end of the sampling period. As may be seen in FIG. 1, this pulse is applied to the set input of write latch 41. As the pulse appears at the write latch 41, the $\overline{Q}$ output of the latch will be switched to a low state. As this occurs, the output from NAND gate 42 will be switched from logic zero to logic 1 upon which the dynamic recirculating memory 17 is placed in a write mode. Simultaneously, the mode control input to the serial converter 32 will go low causing the serial converter to right shift and write to the memory 17 through the next four successive clock pulses.

Control of the number of bits of the binary expression entered into the memory is accomplished by means of a count bits entered counter 44 and a decode 4 entered NAND gate 45. As the $\overline{Q}$ output of the write latch 41 goes low, it is applied as a reset signal to the count bits entered counter 44 resetting that counter to zero. As the next four clock pulses occur during which the data is entered from the serial converter 32 to the memory, a count of four will likewise be clocked into the counter 44. The decode 4 entered NAND gate 45 senses the entry of four bits into the counter 44 and generates a logic zero as a enter count 4 pulse.

The enter count 4 pulse is passed through an inverting differentiator 46 and accomplishes two purposes. First, the pulse is applied as a reset pulse to the write latch 41 which then changes the $\overline{Q}$ output from the latch from a logic zero to a logic 1 state. When this occurs, the recirculating memory 17 is switched back to the recirculating state while the rate word serial converter 32 is returned to the parallel in-parallel out state.

The enter count 4 pulse also is used to count the total number of binary expressions entered into the circulating memory. This is accomplished by applying the pulse through inverting differentiator 46 as one of two inputs to a NAND gate 47 as shown in FIG. 2. The other input to the NAND gate 47 is normally high at this time, as will be seen hereinafter. Accordingly, as the differentiated low pulse appears at the other input to the NAND gate 47, the NAND gate will produce a clock pulse to a count 60 counter 48 registering the entry of one binary expression into the recirculating memory.

During writing to the memory, the write (W) signal applied to the memory 17 is also applied as one of two inputs to a NAND gate 23 associated with the 1024 counter as shown in FIG. 2. During the writing cycle, the write signal (W) is high. This high signal is combined in the NAND gate 23 with the high output from the decode 1024 NAND gate 19 and results in a low reset signal to the counter 18. In this manner, the counter 18 is held from counting during the writing cycle and is permitted to resume count on the next clock pulse following the entry of the last bit of the binary expression into the recirculating memory at which time the write signal (W) goes low.

The recirculating memory is chosen to have a capacity of 1024 bits. Thus, as the counter 18 counts through 1024 and generates a decode 1024 signal, the memory will have likewise made one complete circulation of 1024 bits. The decode 1024 signal is thus an index signal for the last bit entered into memory.

The rate accumulator which had previously been reset to zero now proceeds to accumulate sensed events for the next 60 second sampling period. The count 20 counter 24 will sense 20 recirculations of the memory over the following 60 second sampling period and a second $\overline{\text{60 second transfer}}$ pulse will be created initiating a second write cycle as above described. Inasmuch as the 1024 counter 18 starts its count at the end of the last bit entered into the memory at the conclusion of the writing cycle, the next recording cycle will begin immediately after the last entered bit into the memory. In this manner, indexing and entry of successive rate words into the memory is accomplished in a serial fashion immediately at the end of the prior rate word.

In accordance with the rate recording system of the present invention, it is desired to print out the accumulated rates every 60 minutes. This is accomplished by utilizing a decode 60 NAND gate 51 in conjunction with the counter 48. Whenever the 60th binary expression is written to the memory, the counter 48 will be advanced to a count of 60 and this will be decoded by the NAND gate 51. When this occurs, NAND gate 51 will go low which will result in a differentiated pulse through differentiator 53 which will result in resetting counter 48 to zero. Simultaneously, the pulse from the NAND gate 51 will be inverted in inverter 52 and presented as one of the inputs to a NAND gate 54.

At this time in the sequence of events, read latch 55 will have been set with its $\overline{Q}$ output high. Thus, the second high input to NAND gate 54 is present at this time. Additionally at this time, 784 count latch 56 had also been previously reset providing a low output at the Q terminal.

The resultant low output from NAND gate 54, upon the appearance of the decode 60 signal, will set 784 count latch 56 thus bringing the Q output up. The Q output is inverted in inverter 57 and the resultant output is then a low on the $\overline{\text{784 count}}$ line 58.

It is to be recalled at this point in the sequence of events, the last bit of the 60th binary expression has been entered. As this occurs, count 1024 counter 18 has been reset to zero and has started a new count. As will be recalled, the memory capacity of the recirculating memory is 1024 bits. Since 60 words of four bits each have been entered into the memory, there will be 784 bits of memory which were unused and which must be circulated through the memory before the first entered bit in the first word is reached.

The $\overline{\text{784 count}}$ line 58 is one of the three inputs to the NAND control gates 42 and 43 controlling the recirculated memory. When the $\overline{\text{784 count}}$ line goes low, NAND gate 43 produces a logic "1" at the read input to the memory while NAND gate 42 maintains a logic zero. This input configuration to the recirculating memory places the memory in recirculating mode.

A decode 784 count NAND gate 54 is associated with count 1024 counter 18. When the count in counter 18 reaches a count of 784, representing the arrival of the first bit in the recirculating memory, an output is produced from the decode 784 NAND gate 59. This output is double differentiated in inverting differentiators 60 and 61 and presented as a reset pulse to 784 count latch 56. Resetting of latch 56, operating through inverter 57, now produces a logic 1 or high on $\overline{\text{784 count}}$ line 58. At this point in time, the recirculating memory 17 has been recirculated to a point where the first bit of information entered into the memory is now present at the output from the memory.

When the $\overline{\text{784 count}}$ line 58 goes high, the signal is differentiated in inverting differentiator 72 which sets read latch 55. When read latch 55 is set, the $\overline{Q}$ output of the latch now goes low producing a $\overline{\text{read}}$ signal on line 73.

$\overline{\text{Read}}$ line 73 is applied as one of the inputs to the NAND control gates 42 and 43 controlling the recirculating memory 17. When $\overline{\text{read}}$ line 73 goes low, NAND gates 42 and 43 each produce a logic 1 output. A logic 1 input at both the read and write terminals of memory 17 places the memory in read non-recirculate mode. Accordingly, the data in the memory is now serially clocked out over serial data output line 81 to a serial to parallel output data register 82. The data is passed to the register 82 four bits at a time whereupon it is then presented in parallel to data gates 83 as will be hereinafter described.

Referring back to FIG. 2, as the $\overline{\text{read}}$ signal appears upon line 73, the Q output of read latch 55 will go high and present one input to a NAND gate 66. Clock pulse CL2 provides the other input to the NAND gate 66. The result is a series of clock pulses from NAND gate 66 at clock pulse frequency during the read cycle.

The output from NAND gate 66 is applied to a count 4 exit counter 67. A decode 4 exit NAND gate 68 follows the count 4 exit counter 67 and produces an output pulse each time four bits of information are read from the memory which represents one four bit binary expression.

The output from the decode 4 exit NAND gate 68 is applied through differentiator 65 to reset count 4 exit counter 67 and also as a dump and $\overline{\text{dump}}$ signal through an inverter 69. The dump and $\overline{\text{dump}}$ signals are utilized, as may be seen in FIG. 1, to effect the transfer of each four bits of data from the output data register 82 to data gates 83 and also to control the passage of data from the data gates 83 in parallel to the printer control 84. The printer control 84 utilizes each four bits of data to sequentially print both the Arabic quantity of each rate expression as well as a graph pictorially representative of the quantity of each expression.

Each four bit binary expression read from the recirculating memory is counted in order to determine when the entire content of the memory has been read. This is accomplished by applying the output from the decode 4 exit NAND gate 68 to count 60 counter 48 through NAND gate 47. Whenever a count of 60 has been reached in counter 48, the decode 60 NAND gate 51 will go low. When this occurs, the signal is inverted in inverter 52 and applied as one of the two inputs to a NAND gate 49. The other input to the NAND gate is the Q output from the read latch 55 which is also high at this time. The output from the NAND gate 49 is differentiated in an inverting differentiator 50 and applied to the read latch 55 as a reset pulse. Upon resetting read latch 55, the signal upon read line 73 then goes high terminating the read recirculating mode in the memory.

Referring now to FIG. 2, the read signal, upon going positive, is differentiated in an inverting differentiator 71. The resultant negative going pulse from the differentiator 71 is applied through NAND gate 10 to create a reset pulse and a reset pulse through inverter 11 which in the same manner as discussed in the turn on and initialization of the recording system. The differentiated positive going read pulse is also redifferentiated in inverting differentiator 12 and applied through OR gate 29 to generate a transfer data pulse. Accordingly, at this time the counters and accumulators have been reset to zero and the displays likewise returned to zero for the beginning of an entire new 60 minute cycle.

The foregoing description of the operation of the rate recording system of the present invention has been made in respect to components expressed in terms of general function and block diagrams. Any number of different types of components may be employed to carry out the intended functions set forth in the block diagrams and no limitation of the invention to any specific components is intended. However, in a specific embodiment, the following components have been found applicable in carrying out the invention. For the purposes of clarity in explanation of the invention, circuitry for creating compatibility between MOS and TTL components, supply voltages and the like have been omitted and should be within the knowledge of one skilled in the art.

COMPONENT TABLE

| Component Number | Industry Designation |
|---|---|
| 10 | 7400 |
| 14 | 7497 |
| 15 | 7493 (3) |
| 17 | 2524 |
| 18 | 4020 |
| 19 | 4011 |
| 22 | 4012 |
| 23 | 4011 |
| 24 | 40241 |
| 25 | 4012 |
| 29 | 7400 |
| 30 | 7475 |
| 31 | 7475 |
| 32 | 7495 |
| 33 | 8T06 |
| 34 | MAN4 |
| 35 | 7400 |
| 36 | 8T06 |
| 37 | 7400 |
| 37 | 7404 |
| 37 | 9301 |
| 37 | 9493 |
| 37 | 7420 |
| 38 | MAN4 |
| 41 | 7400 |
| 42 | 7400 |
| 43 | 7400 |
| 44 | 7493 |
| 45 | 7410 |
| 48 | 7493 |
| 51 | 7430 |
| 54 | 7400 |
| 55 | 7400 |
| 56 | 7400 |
| 59 | 4023 |
| 66 | 7400 |
| 67 | 7493 |
| 68 | 7400 |
| 82 | 7495 |
| 83 | 7400. |

The rate recording system of the present invention has been described in respect to the particular embodiment thereof shown in the drawings and the particular types of components as set out in the table above. It will be appreciated by those skilled in the art that such variables as the sampling period, rate expression word length and memory capacity can be varied together with suitable adjustment in the counters and the coding components to suit the particular application involved. For these reasons, the particular embodiment disclosed is to be considered illustrative only and the scope of the invention is not intended to be thereby limited but is to be interpreted in view of the claims.

I claim:

1. A system for determining and recording a plurality of individual rates of occurrence of predetermined events over a time span comprising:

sensor-accumulator means for sensing and accumulating the occurrence of each event during predetermined time intervals and translating the successively occurring accumulations into binary expressions;

a dynamic recirculating memory having read and write functions; and memory input control means for serially loading the memory with successively occurring binary rate expressions including memory position counter means which is reset upon initiation of entry of a binary expression and its count initiated upon entry of the last bit of the binary expression and input decoding means responsive to a count in the counter means equaling the memory capacity for generating a memory synchronizing pulse to thereby index the last bit entered permitting synchronous entry into memory of successively generated binary rate expressions.

2. The system of claim 1 wherein the sensor-accumulator means includes a binary counter for counting events and a parallel in-serial out shift register, the input to which is from the binary counter and the output thereof is the input to the dynamic recirculating memory.

3. The system of claim 1 wherein the memory positioning counter means is a counter of capacity equal to the capacity of the recirculating memory and the decoding means decodes a full count in the memory position counter means indicating one complete circulation of memory.

4. The system of claim 3 further including a sampling interval counter responsive to a predetermined number of full counts of the memory position counter to provide an output determinative of the predetermined time interval for accumulating sensed events and for generating a signal initiating writing to the memory.

5. The system of claim 4 wherein each binary expression is of a predetermined word length and further including a bit entered counter which initiates counting upon writing to the memory and generates a signal for terminating writing to the memory upon reaching a count equal to the predetermined word length.

6. The system of claim 5 further including a word entered counter responsive to the bit entered counter to count the number of binary expressions written to the memory and to generate a terminate recording signal upon a predetermined count indicative of rate recording for a predetermined time interval.

7. The system of claim 6 further including memory output control means for initiating a memory readout signal upon the memory recirculating to the first binary expression entered into memory including output decoding means responsive to the occurrence of the terminate recording signal and a count in the memory position counter representative of the difference between the memory capacity and the total number of bits entered.

8. The system of claim 7 further including a bit exit counter responsive to the presence of the memory readout signal and a bit count equal to the predetermined binary expression word length to generate a print signal.

9. The system of claim 8 further including a word entered counter responsive to the print signal and a total count equal to the number of words entered to memory to generate a terminate read signal.

* * * * *